2,767,213
Patented Oct. 16, 1956

2,767,213

RESOLUTION OF METHYLMERCAPTOPHENYL-AMINOPROPANE-DIOL

Loren M. Long, Grosse Pointe Woods, Mich., assignor to Parke, Davis & Company, Detroit, Mich., a corporation of Michigan No Drawing. Application December 30, 1952,
Serial No. 328,809

8 Claims. (Cl. 260—570.6)

This invention relates to a process for the production of the optical isomers of threo-1-p-methylmercaptophenyl-2-aminopropane-1,3-diol.

D - (—) - threo - 1 - p - methylmercaptophenyl - 2-aminopropane-1,3-diol is an important intermediate for the production of certain therapeutically valuable sulfur containing analogs of chloramphenicol. It has been proposed to produce this compound by resolution of DL-threo-1-p-methylmercaptophenyl-2-aminopropane via its d-tartaric acid salts. This procedure has a number of disadvantages. It requires the use of another expensive reagent, d-tartaric acid, and such a process which involves many tedious and slow fractional crystallizations is not particularly suitable for industrial purposes. Moreover, since the separation obtained by fractional crystallization of optically active salts is not very complete frequent fractional crystallization of each crop is required in order to obtain the desired optical isomer in pure form. The process of the present invention eliminates these disadvantages and makes it possible to resolve DL - threo-1-p-methylmercaptophenyl-2-aminopropane very cheaply and in good yield.

In accordance with the invention the optical isomers of threo-1-p-methylmercaptophenyl-2-aminopropane-1,3-diol are produced by heating a mixture comprising DL-threo - 1 - p - methylmercaptophenyl - 2 - aminopropane-1,3-diol, a small amount of one of the optical isomers of DL-threo-1-p-methylmercaptophenyl-2-aminopropane-1,3-diol and sufficient water to dissolve the solids when warm but insufficient to dissolve the solids at ordinary temperature, until solution is complete, cooling the solution, collecting the optical isomer which separates from the solution in crystalline form, adding to the mother liquor approximately the same weight of DL - threo - 1 - p - methyl - mercaptophenyl - 2 - aminopropane-1,3-diol as the weight of the optical isomer separated from the solution, heating the mixture until the solution is complete, cooling the solution and collecting the other optical isomer which separates from the solution in crystalline form. A fresh portion of DL-threo-1-p-methylmercaptophenyl-2-aminopropane-1,3-diol approximately equal in weight to the weight of the last crop of separated optical isomer can then be added to the mother liquor and the process repeated to obtain a second crop of the first optical isomer. Addition of a fresh portion of DL-threo-1-p-methylmercaptophenyl-2-aminopropane-1,3-diol of approximately the same weight as the second crop of the first optical isomer to the solution and repetition of the process yields a second crop of the second or other optical isomer. The process can be carried on indefinitely and large quantities of the DL-threo-1-p-methylmercaptophenyl-2-aminopropane-1,3-diol resolved into its optical isomers using the same solution by adding fresh portions of the racemic compound to the mother liquor and repeating the crystal-lizing process. The number of phases or cycles which can be used in practice is limited only by the purity of the DL - threo - 1 - p - methylmercaptophenyl - 2 - aminopropane-1,3-diol used as the starting material. For example, using racemic material melting at 124–6° C. (130° C. melting point of pure racemate) the process can be repeated about twenty to thirty times before it is necessary to recover the material present in the mother liquor and commence the process anew. With starting material which is chemically pure fifty or more crops can be collected before recovering the material from the mother liquor. This makes it possible to operate the process in a semi-continuous fashion rather than as a "batch-type" process. Of equally great importance is the fact that the optical isomers separate from the solution in almost pure form and consequently tedious fractional crystallization of each crop of product is unnecessary. Still another important characteristic of the process is that the rate of cooling the crystallizing solution apparently does not have any effect upon the amount nor the nature of the material which crystallizes from the solution and consequently it is possible to collect a crop of crystalline material every few hours. This is in marked contrast to resolution processes involving fractional crystallization of acid addition salts which require slow and careful cooling of the crystallizing solution followed by digestion at low temperature in order to obtain a satisfactory separation.

In carrying out the process of the invention the initial mixture can contain an excess of either the D-(—)- or the L-(+)-optical isomer. The amount of the excess is not particularly critical and can vary from about 2 to 15%. Best results are obtained when the initial mixture contains between 8 to 12% by weight of one of the optical isomers in relationship to the weight of the racemic component. The first optical isomer to crystallize from the solution is the optical isomer which has been added to the initial mixture. Thus if one employs an initial mixture containing an excess of the D-(—) isomer the first isomer to separate from the solution is the D-(—) isomer. The size of this first crop of crystalline material varies, of course, with the conditions employed in the process but in no instance is it smaller than the excess of the optical isomer present in the initial mixture. Under most conditions the first crop of material weighs approximately twice as much as the excess of the optical isomer introduced into the initial mixture.

Since the threo-1-p-methylmercaptophenyl-2-aminopropane-1,3-diols are quite insoluble in water it is preferable to reduce the volume of water necessary for the process by using an initial mixture which contains up to 80% of the amount of a mineral acid theoretically necessary to neutralize the DL-threo-1-p-methylmercaptophenyl-2-aminopropane-1,3-diol component. As mineral acids hydrochloric, sulfuric, hydrobromic, nitric, phosphoric and the like acids can be employed. For convenience, the most practical working volumes are obtained when the amount of the mineral acid is between 65 and 85%, preferably 70 to 75%, of the amount theoretically required to neutralize the racemic amino diol component of the mixture. When using optimal quantities of mineral acid, the amount of water used for the process is in the neighborhood of 7 to 15 parts by weight for each part by weight of the total solids in the mixture.

In producing the preferred acidic initial mixture used as the starting material in the process one can merely add the free bases of the DL-threo-1-p-methyl-mercaptophenyl-2-aminopropane-1,3-diol and the optical isomer to the required amount of water containing the mineral acid or to the water and add the mineral acid to the mixture. One can also employ the mineral acid salts of the amino diol components and simply add the requisite amount of alkali or ammonia to partially neutralize the mineral acid salts. It is also possible to use 80% or less of the DL-component in the form of a mineral acid salt and the balance in the free base form. The exact mode of producing the initial mixture is not critical and as it has been pointed out it can be produced by a variety of methods.

As mentioned above, sufficient water is employed in the process to dissolve the solids when warm but insufficient to dissolve the solids at ordinary temperature, that is, 22 to 27° C. The amount of water varies depending upon whether a mineral acid has been added to the mixture and, if so, the quantity of acid present. Generally speaking, the amount of water is chosen so that complete solution of the solids takes place at about 60 to 70° C. although if desired, less water can be used but this necessitates heating the mixture to a higher temperature to obtain complete solution. In carrying out the cooling phase of the process it is not necessary to cool the solution below about room temperature, 20 to 30° C., in order to cause satisfactory amounts of the optical isomers to separate from the solution. It is also not necessary to allow the cool crystallizing solution to stand for any great time in order for complete crystallization to take place. In general, if the solution is seeded at a temperature of about 35° C. crystallization is complete within one-half to one hour after the temperature of the solution has dropped to about 25° C.

The invention is illustrated by the following examples.

Example 1

10.65 g. of DL-threo-1-p-methylmercaptophenyl-2-aminopropane-1,3-diol (M. P. 124–6° C.) and 1.065 g. of D-(−)-threo-1-p-methylmercaptophenyl-2-aminopropane-1,3-diol ($[\alpha]_D^{26} = -25.9°$ in absolute ethanol) are added to 71.5 cc. of distilled water. 35 cc. of 1 N hydrochloric acid is added and the mixture heated and stirred on a steam bath until a clear solution is obtained (temperature=65–70° C.). The solution is cooled to 45° C. and seeded with a crystal D-(−)-threo-1-p-methylmercaptophenyl-2-aminopropane-1,3-diol. At 35° C. crystallization commences. The mixture is allowed to cool with stirring to 27° C. (2 hours) and the crystalline D-(−)-threo-1-p-methylmercaptophenyl-2-aminopropane-1,3-diol is collected and washed with water; yield 2.17 g.; M. P. 149–51° C.; $[\alpha]_D^{25} = -25°$ in ethanol. The filtrate and washings are combined and used in the next step.

2.17 g. of DL-threo-1-p-methylmercaptophenyl-2-aminopropane-1,3-diol (M. P. 134–6° C.) is added to the solution and the mixture heated at 65° C. until a clear solution is obtained. The solution is cooled to 40° C., seeded with a crystal of L-(+)-threo-1-p-methylmercaptophenyl-2-aminopropane-1,3-diol and allowed to cool. At 35° C. crystallization commences. The mixture is allowed to stand overnight at room temperature and the crystalline L-(+)-threo-1-p-methylmercaptophenyl-2-aminopropane-1,3-diol collected and washed with water; yield 2.37 g.; M. P. 148–52° C.;

$$[\alpha]_D^{25} = +27.5°$$

in ethanol. The filtrate and washings are combined and used in the next step.

2.10 g. of DL-threo-1-p-methylmercaptophenyl-2-aminopropane-1,3-diol is added to the solution and the above procedure repeated several times. After each crop of resolved amino diol is removed an equal amount of the racemic amino diol is added to the filtrate and washings. The following table is a summary of the results obtained in this particular experiment.

[Initial DL-threo-1-p-methylmercaptophenyl-2-aminopropane-1,3-diol =10.65 g. Initial D-(−)-threo-1-p-methylmercaptophenyl-2-aminopropane-1,3-diol=1.065 g.]

| Crop | Weight, g. | Composition | M. P., °C. | $[\alpha]_D^{25-27}$ in ethanol, degrees | Weight (g.) of DL-threo compound added to solution |
|---|---|---|---|---|---|
| I | 2.17 | D-(−) | 149–151.5 | −25 | 2.17 |
| II | 2.37 | L-(+) | 148–152 | +27.5 | 2.37 |
| III | 2.10 | D-(−) | 150–153 | −26.8 | 2.10 |
| IV | 1.76 | L-(+) | 147–151 | +24.6 | 1.76 |
| V | 1.70 | D-(−) | 150–152.5 | −26.4 | ¹ 1.7 |
| VI | 2.54 | L-(+) | 150–153 | +26.6 | 2.54 |
| VII | 1.78 | D-(−) | 150–152.5 | −24.9 | |

¹ Also 1 g. of L-(+)-threo-1-p-methylmercaptophenyl-2-aminopropane-1,3-diol from crop II.

At the end of the seven phases or cycles the yield of D-(−)-threo-1-p-methylmercaptophenyl-2-aminopropane-1,3-diol was 7.75 g. and the yield of L-(+)-threo-1-p-methylmercaptophenyl-2-aminopropane-1,3-diol was 6.67 g. A total of 12.64 g. of additional DL-threo-1-p-methylmercaptophenyl-2-aminopropane-1,3-diol was added during the process thus making the total quantity of racemate 24.36 g. The final filtrate was made basic with an excess of concentrated ammonium hydroxide, the mixture cooled to 10° C. and the solid collected. After washing and drying the solid weighed 8.4 g. and melted at 126–132° C. The optical rotation was $[\alpha]_D^{26} = +3.14$ indicating that it contained about an 11% excess of the L-(+) isomer. The total solid accounted for was 22.82 grams. The loss of 1.54 g. was due largely to the fact that the racemic base used was crude material.

By starting with an initial mixture containing 10.65 g. of DL-threo-1-p-methylmercaptophenyl-2-aminopropane-1,3-diol and 1.065 g. of L-(+)-threo-1-p-methylmercaptophenyl-2-aminopropane-1,3-diol one obtains similar results to those described above. However, in this instance the composition of the crops is just the opposite of those obtained in the preceding description.

Example 2

A mixture consisting of 40 g. of crude DL-threo-1-p-methylmercaptophenyl-2-aminopropane-1,3-diol ($[\alpha]_D^{25} = -7.99$ in alcohol) containing approximately 10 g. of D-(−)-threo-1-p-methylmercaptophenyl-2-aminopropane-1,3-diol, 70 g. of DL-threo-1-p-methylmercaptophenyl-2-aminopropane-1,3-diol, 329 cc. of 1 N hydrochloric acid and 670 cc. of water is heated on a steam bath until solution is complete. The solution is cooled quickly to 40° C. and then allowed to cool slowly to 25° C. The crystalline D-(−)-threo-1-p-methylmercaptophenyl-2-aminopropane-1,3-diol is collected, washed with a little cold water and dried; yield 19 g.; M. P. 146–51° C.; $[\alpha]_D^{25} = -26°$ in ethanol.

119 g. of DL-threo-1-p-methylmercaptophenyl-2-aminopropane-1,3-diol, 10 g. of L-(+)-threo-1-p-methylmercaptophenyl-2-aminopropane-1,3-diol, 329 cc. of 1 N hydrochloric acid and 600 cc. of water are added to the filtrate and washings from above and the mixture heated on a steam bath until solution is complete. The solution is cooled quickly to 45° C. and then allowed to cool slowly to 25° C. with agitation. The L-(+)-threo-1-p-methylmercaptophenyl-2-aminopropane-1,3-diol is collected, washed with a little water and dried; yield 30 g.; M. P. 146–50° C.; $[\alpha]_D^{25} = +26.6°$ in ethanol.

30 g. of DL-threo-1-p-methylmercaptophenyl-2-aminopropane-1,3-diol is added to the filtrate from the preceding step and the mixture heated until solution is complete. The solution is cooled to room temperature and the crystalline D-(−)-threo-1-p-methylmercaptophenyl-2-aminopropane-1,3-diol collected; yield 30 g.; M. P. 148–50° C.; $[\alpha]_D^{25} = -25.4°$ in ethanol.

The filtrate from the preceding step is mixed with 243 g. of DL-threo-1-p-methylmercaptophenyl-2-aminopropane-1,3-diol, 21.3 g. of L-(+)-threo-1-p-methylmercatophenyl-2-aminopropane-1,3-diol, 1800 cc. of water and 59.5 cc. of concentrated hydrochloric acid. The mixture is heated until solution is complete and the solution allowed to cool with stirring. The crystalline L-(+)-threo-1-p-methylmercaptophenyl-2-aminopropane-1,3-diol is collected, washed with a little water and dried; yield 58 g.; M. P. 147–51° C.; $[\alpha]_D^{25} = +25.3°$ in ethanol.

70 g. of DL-threo-1-p-methylmercaptophenyl-2-aminopropane-1,3-diol is added to the filtrate from the preceding step and the mixture heated until solution is complete. The solution is cooled rapidly to 28° C., seeded and agitated for one and a half hours. The crystalline D-(−)-threo-1-p-methylmercaptophenyl-2-aminopropane-1,3-diol is collected, washed with a little water and dried; yield 70 g.; M. P. 146–51° C.; $[\alpha]_D^{25} = -25.2°$ in ethanol.

70 g. of DL-threo-1-p-methylmercaptophenyl-2-aminopropane-1,3-diol is added to the filtrate from the preceding step and the mixture heated at 70° C. until solution is complete. The solution is cooled rapidly to 35° C. and then allowed to cool slowly to 25° C. while stirring. After about one hour the crystalline L-(+)-threo-1-p-methylmercaptophenyl-2- aminopropane-1,3- diol is collected, washed with a little water and dried; yield 69.3 g.; $[\alpha]_D^{25} = +25.1°$ in ethanol.

70 g. of DL-threo-1-p-methylmercaptophenyl-2-aminopropane-1,3-diol is added to the filtrate from the preceding step and the mixture heated at 70° C. until solution is complete. The solution is cooled rapidly to 35° C. and then allowed to cool slowly to 25° C. with stirring. The crystalline D-(−)-threo-1-p-methylmercaptophenyl-2-aminopropane-1,3-diol is collected, washed with a little water and dried; yield 67.4 g.; $[\alpha]_D^{25} = -25.6°$ in ethanol.

70 g. of DL-threo-1-p-methylmercaptophenyl-2-aminopropane-1,3-diol is added to the filtrate from the preceding step and the procedure described in the preceding steps repeated about forty times. The following table is a summary of the results obtained in the subsequent steps of the process. The present step in the table is numbered 1.

| Crop | Weight, g. | Composition | $[\alpha]_D^{25}$ +1 | Weight (g.) of DL-threo compound added to solution |
|---|---|---|---|---|
| 1 | 68.7 | L-(+) | +24.6° | 70. |
| 2 | 85.5 | D-(−) | −24.3° | 80. |
| 3 | 79.3 | L-(+) | +24.5° | 70. |
| 4 | 63.6 | D-(−) | −25.4° | 70. |
| 5 | 71.2 | L-(+) | +25.2° | 70. |
| 6 | 74.2 | D-(−) | −24.4° | 70. |
| 7 | 67.4 | L-(+) | +25.6° | 70. |
| 8 | 66.9 | D-(−) | −23.8° | 70. |
| 9 | 61.5 | L-(+) | +25.2° | 70. |
| 10 | 84.3 | D-(−) | −26.2° | 69. |
| 11 | 94.1 | L-(+) | +24.9° | 71. |
| 12 | 79.5 | D-(−) | −24.6° | 70. |
| 13 | 73.5 | L-(+) | +25.1° | 70. |
| 14 | 61.6 | D-(−) | −25.6° | 70. |
| 15 | 57.2 | L-(+) | +30.6° * | 70. |
| 16 | 68.1 | D-(−) | −23.9°;−29.2° * | 70. |
| 17 | 76.4 | L-(+) | +25.0°;+30.6° * | 70. |
| 18 | 56.6 | D-(−) | −26.8°;−30.6° * | 70. |
| 19 | 69.1 | L-(+) | +24.7°;+30.2° * | 70. |
| 20 | 62.8 | D-(−) | −24.7°;−30.4° * | 70. |
| 21 | 56.9 | L-(+) | +24.2°;+29.6° * | 70. |
| 22 | 77.1 | D-(−) | −24.8°;−30.4° * | 70. |
| 23 | 66.5 | L-(+) | −24.4°;+29.8° * | 70. |
| 24 | 60.4 | D-(−) | | 70. |
| 25 | 64.0 | L-(+) | +30.4° * | 70. |
| 26 | 93.7 | D-(−) | −30.5° * | 70. |
| 27 | 54.1 | L-(+) | +30.4° * | 70. |
| 28 | 79.4 | DL- | −0.71° | 70. |
| 29 | 51.2 | DL | +6° | 70. |
| 30 | 86.7 | L-(+) | +30.7° * | 50 (crop 29)+ 40 g. L-(+). |
| 31 | 86 | D-(−) | −31.2° * | 78 (crop 28)+2 g. DL. |
| 32 | 67 | L-(+) | | 80. |
| 33 | 63 | D-(−) | −30.4° * | 80. |
| 34 | 80.4 | L-(+) | | 80. |
| 35 | 80 | D-(−) | −25.7°;−32.1° * | 80. |
| 36 | 55 | L-(+) | | 80. |
| 37 | 46 | D-(−) | −30.1° * | 80. |
| 38 | 64 | L-(+) | | 80. |
| 39 | 95 | D-(−) | −26.5° | 80. |

NH₄OH added and DL-amino diol recovered.

¹ Rotations all in ethanol except those marked (*) which are in dimethyl acetamide.

What I claim is:

1. Process for the production of the optical isomers of threo-1-p-methylmercaptophenyl-2-aminopropane-1,3-diol which comprises heating a mixture comprising DL-threo-1-p-methylmercaptophenyl-2-aminopropane-1,3-diol, a small amount of one of the optical isomers of DL-threo-1-p-methylmercaptophenyl-2-aminopropane-1,3-diol and sufficient water to dissolve the solids when warm but insufficient to dissolve the solids at ordinary temperature, until solution is complete, cooling the solution, collecting the optical isomer which separates from the solution in crystalline form, adding to the mother liquor approximately the same weight of DL-threo-1-p-methylmercaptophenyl-2-aminopropane-1,3-diol as the weight of the optical isomer separated from the solution, heating the mixture until solution is complete, cooling the solution and collecting the other optical isomer which separates from the solution in crystalline form.

2. Process for the production of the optical isomers of threo - 1 - p - methylmercaptophenyl-2-aminopropane-1,3-diol which comprises heating a mixture composed of DL-threo - 1 - p - methylmercaptophenyl - 2 - aminopropane-1,3-diol, a small amount of one of the optical isomers of DL - threo - 1 - p - methylmercaptophenyl - 2 - aminopropane-1,3-diol, sufficient mineral acid to react with not more than 85% of the DL - threo - 1 - p - methylmercaptophenyl-2-aminopropane-1,3-diol and sufficient water to dissolve the solids in the acid solution when warm but insufficient to dissolve the solids at ordinary temperature, until solution is complete, cooling the solution, collecting the optical isomer which separates from the solution in crystalline form, adding to the mother liquor approximately the same weight of DL-threo-1-p-methylmercaptophenyl-2-aminopropane-1,3-diol as the weight of the optical isomer separated from the solution, heating the mixture until solution is complete, cooling the solution and collecting the other optical isomer which separates from the solution in crystalline form.

3. Process for the production of the optical isomers of threo-1-p-methylmercaptophenyl-2-aminopropane-1,3-diol which comprises heating a mixture composed of DL-threo-1-p-methylmercaptophenyl-2-aminopropane, a quantity of D-(−)-threo-1-p-methylmercaptophenyl-2-aminopropane-1-3-diol which corresponds to 2 to 15% by weight of the DL-threo-1-p-methylmercaptophenyl-2-aminopropane-1,3-diol, sufficient mineral acid to react with not more than 85% of the DL-threo-1-p-methylmercaptophenyl-2-aminopropane-1,3-diol and sufficient water to dissolve the solids in the acid solution when warm but insufficient to dissolve the solids at ordinary temperature, until solution is complete, cooling the solution, collecting the D-(−)-threo-1-p-methylmercaptophenyl-2-aminopropane-1,3-diol which separates from the solution in crystalline form, adding to the mother liquor approximately the same weight of DL-threo-1-p-methylmercaptophenyl-2-aminopropane-1,3-diol as the weight of the D-(−)-threo isomer separated from the solution, heating the mixture until solution is complete, cooling the solution and collecting the L-(+)-threo-1-p-methylmercaptophenyl-2-aminopropane-1,3-diol which separates from the solution in crystalline form.

4. Process for the production of the optical isomers of threo - 1 - p - methylmercaptophenyl - 2 - aminopropane-1,3-diol which comprises heating a mixture composed of DL-threo-1-p-methylmercaptophenyl-2-aminopropane, a quantity of L-(+)-threo-1-p-methylmercaptophenyl-2-aminopropane-1,3-diol which corresponds to 2 to 15% by weight of the DL-threo-1-p-methylmercaptophenyl-2-aminopropane-1,3-diol, sufficient mineral acid to react with not more than 85% of the DL-threo-1-p-methylmercaptophenyl-2-aminopropane-1,3-diol and sufficient water to dissolve the solids in the acid solution when warm but insufficient to dissolve the solids at ordinary temperature, until solution is complete, cooling the solution, collecting the L-(+)-threo-1-p-methylmercaptophenyl-2-aminopropane-1,3-diol which separates from the solution in crystalline form, adding to the mother liquor approximately the same weight of DL-threo-1-p-methylmercaptophenyl-2-aminopropane-1,3-diol as the weight of the L-(+)-threo isomer separated from the solution, heating the mixture until solution is complete, cooling the solution and collecting the D-(—)-threo-1-p-methylmercaptophenyl-2-aminopropane-1,3-diol which separates from the solution in crystalline form.

5. Process for the production of the optical isomers of threo - 1 - p - methylmercaptophenyl - 2 - aminopropane-1,3-diol which comprises heating a mixture composed of DL - threo - 1 - p - methylmercaptophenyl - 2 - aminopropane-1,3-diol, a quantity of D-(—)-threo-1-p-methylmercaptophenyl - 2 - aminopropane - 1,3 - diol which corresponds to 8 to 12% by weight of the DL-threo-1-p-methylmercaptophenyl - 2 - aminopropane-1,3 - diol, sufficient mineral acid to react with 65 to 80% of the DL-threo - 1 - p - methylmercaptophenyl - 2 - aminopropane-1,3-diol and 7 to 15 parts of water by weight for each part by weight of total solids in the mixture, until solution is complete, cooling the solution, collecting the D-(—)-threo - 1 - p - methylmercaptophenyl - 2 - aminopropane-1,3-diol which separates from the solution in crystalline form, adding to the mother liquor approximately the same weight of DL-threo-1-p-methylmercaptophenyl-2-aminopropane-1,3-diol as the weight of the D-(—)-threo isomer separated from the solution, heating the mixture until solution is complete, cooling the solution and collecting the L-(+)-threo-1-p-methylmercaptophenyl-2-amino-propane-1,3-diol which separates from the solution in crystalline form.

6. Process for the production of the optical isomers of threo - 1 - p - methylmercaptophenyl - 2 - aminopropane-1,3-diol which comprises heating a mixture composed of DL - threo - 1 - p - methylmercaptophenyl - 2 - aminopropane-1,3-diol, a quantity of L-(+)-threo-1-p-methylmercaptophenyl-2-aminopropane-1,3-diol which corresponds to 8 to 12% by weight of the DL-threo-1-p-methylmercaptophenyl-2-aminopropane-1,3-diol, sufficient mineral acid to react with 65 to 80% of the DL-threo-1-p-methylmercaptophenyl-2-aminopropane-1,3-diol and 7 to 15 parts of water by weight for each part by weight of total solids in the mixture, until solution is complete, cooling the solution, collecting the L-(+)-threo-1-p-methylmercaptophenyl-2-aminopropane-1,3-diol which separates from the solution in crystalline form, adding to the mother liquor approximately the same weight of DL-threo-1-p-methylmercaptophenyl - 2 - aminopropane - 1,3 - diol as the weight of the L-(+)-threo isomer separated from the solution, heating the mixture until solution is complete, cooling the solution and collecting the D-(—)-threo - 1 - p - methylmercaptophenyl - 2 - aminopropane-1,3-diol which separates from the solution in crystalline form.

7. Process for the production of the optical isomers of threo - 1 - p - methylmercaptophenyl - 2 - aminopropane-1,3-diol which comprises heating a mixture composed of DL - threo - 1 - p - methylmercaptophenyl - 2 - aminopropane - 1,3 - diol, a quantity of D - (—) - threo - 1 - p - methylmercaptophenyl - 2 - aminopropane - 1,3 - diol which corresponds to 8 to 12% by weight of the DL-threo - 1 - p - methylmercaptophenyl - 2 - aminopropane-1,3-diol, sufficient mineral acid to react with 65 to 80% of the DL - threo - 1 - p - methylmercaptophenyl - 2 - aminopropane-1,3-diol and 7 to 15 parts of water by weight for each part by weight of total solids in the mixture, until solution is complete, cooling the solution, collecting the D-(—)-threo-1-p-methylmercaptophenyl-2-aminopropane-1,3-diol which separates from the solution in crystalline form, adding to the mother liquor approximately the same weight of DL-threo-1-p-methylmercaptophenyl - 2 - aminopropane - 1,3 - diol as the weight of the D-(—)-threo isomer separated from the solution, heating the mixture until solution is complete, cooling the solution and collecting the L-(+)-threo-1-p-methylmercaptophenyl-2-aminopropane-1,3-diol which separates from the solution in crystalline form, adding to the mother liquor approximately the same weight of DL-threo-1-p-methylmercaptophenyl-2-aminopropane-1,3-diol as the weight of the L-(+) isomer separated from the solution, heating the mixture until solution is complete, cooling the solution, collecting the second crop of D-(—)-threo-1-p-methylmercaptophenyl - 2 - aminopropane - 1,3 - diol which separates from the solution in crystalline form, adding to the mother liquor approximately the same weight of DL - threo - 1 - p - methylmercaptophenyl - 2 - aminopropane - 1,3 - diol as the weight of the second crop of the D-(—) isomer, heating the mixture until solution is complete, cooling the solution, collecting the second crop of L - (+) - threo - 1 - p - methylmercaptophenyl - 2 - aminopropane - 1,3 - diol which separates from the solution in crystalline form and repeating said additions and crystallizations a number of times thereby obtaining further quantities of D - (—) - threo - 1 - p - methylmercaptophenyl - 2 - aminopropane - 1,3 - diol and L - (+) - threo - 1 - p - methylmercaptophenyl - 2 - aminopropane-1,3-diol.

8. Process for the production of the optical isomers of threo - 1 - p - methylmercaptophenyl - 2 - aminopropane-1,3-diol which comprises heating a mixture composed of DL - threo - 1 - p - methylmercaptophenyl - 2 - aminopropane - 1,3 - diol, a quantity of L - (+) - threo - 1 - p - methylmercaptophenyl - 2 - aminopropane - 1,3 - diol which corresponds to 8 to 12% by weight of the DL-threo - 1 - p - methylmercaptophenyl - 2 - aminopropane-1,3-diol, sufficient mineral acid to react with 65 to 80% of the DL-threo-1-p-methylmercaptophenyl-2-aminopropane-1,3-diol and 7 to 15 parts of water by weight for each part by weight of total solids in the mixture, until solution is complete, cooling the solution, collecting the L - (+) - threo - 1 - p - methylmercaptophenyl - 2 - aminopropane-1,3-diol which separates from the solution in crystalline form, adding to the mother liquor approximately the same weight of DL - threo - 1 - p - methylmercaptophenyl - 2 - aminopropane - 1,3 - diol as the weight of the L-(+)-threo isomer separated from the solution, heating the mixture until solution is complete, cooling the solution, collecting the D-(—)-threo-1-p-methylmercaptophenyl - 2 - aminopropane - 1,3 - diol which separates from the solution in crystalline form, adding to the mother liquor approximately the same weight of DL - threo - 1 - p - methylmercaptophenyl - 2 - aminopropane - 1,3 - diol as the weight of the D-(—) aminopropane - 1,3 - diol as the weight of the D-(—) isomer separated from the solution, heating the mixture until solution is complete, cooling the solution, collecting the second crop of L-(+)-threo-1-p-methylmercaptophenyl-2-aminopropane-1,3-diol which separates from the solution in crystalline form, adding to the mother liquor approximately the same weight of DL-threo-1-p-methylmercaptophenyl - 2 - aminopropane - 1,3 - diol as the weight of the second crop of the L-(+) isomer, heating the mixture until solution is complete, cooling the solution, collecting the second crop of D-(—)-threo-1-p-methylmercaptophenyl - 2 - aminopropane - 1,3 - diol which separates from the solution in crystalline form and repeating said additions and crystallizations a number of times thereby obtaining further quantities of L-(+)-threo - 1 - p - methylmercaptophenyl - 2 - aminopropane-1,3 - diol and D - (—) - threo - 1 - p - methylmercaptophenyl-2-aminopropane-1,3-diol.

References Cited in the file of this patent

UNITED STATES PATENTS 2,650,938     Gero _____ Sept. 1, 1953

FOREIGN PATENTS 510,097     Belgium _____ Apr. 15, 1952

OTHER REFERENCES

Gilman: "Org. Chem.," Wiley and Sons, N. Y. C. (1938), vol. I, pp. 187–88.

Schmidt: "Org. Chem.," 6th ed. (1950), pp. 34–35.